United States Patent
McCullough et al.

(10) Patent No.: US 7,058,859 B2
(45) Date of Patent: *Jun. 6, 2006

(54) TRACE REPORTING METHOD AND SYSTEM

(75) Inventors: Dennis I. McCullough, Tustin, CA (US); Larry A. Traylor, Tustin, CA (US)

(73) Assignee: American Arium, Tustin, CA (US)

( * ) Notice: Subject to any disclaimer, the term of this patent is extended or adjusted under 35 U.S.C. 154(b) by 397 days.

This patent is subject to a terminal disclaimer.

(21) Appl. No.: 10/651,485

(22) Filed: Aug. 29, 2003

(65) Prior Publication Data

US 2004/0158776 A1    Aug. 12, 2004

Related U.S. Application Data

(63) Continuation of application No. 10/095,545, filed on Mar. 11, 2002, now Pat. No. 6,615,371.

(51) Int. Cl.
*H02H 3/05* (2006.01)
(52) U.S. Cl. ...................................................... 714/45
(58) Field of Classification Search ............... 714/45
See application file for complete search history.

(56) References Cited

U.S. PATENT DOCUMENTS

| | | | |
|---|---|---|---|
| 6,094,729 A | 7/2000 | Mann | 714/25 |
| 6,243,836 B1 | 6/2001 | Whalen | 714/45 |
| 6,247,146 B1* | 6/2001 | Wheatley et al. | 714/38 |
| 6,314,530 B1 | 11/2001 | Mann | 714/38 |
| 6,347,383 B1 | 2/2002 | Elnozahy | 714/53 |
| 6,542,855 B1 | 4/2003 | Pontius | 702/186 |
| 6,684,348 B1* | 1/2004 | Edwards et al. | 714/45 |
| 2002/0184477 A1 | 12/2002 | Swaine et al. | 712/227 |

OTHER PUBLICATIONS

Furber, *ARM System-on-Chip Architecture*, 2nd ed., 2000, pp. 237-239.
ARM Limited, *Embedded Trace Macrocell Specification*, 2000, pp. 5-1-5-34.

* cited by examiner

*Primary Examiner*—Scott Baderman
*Assistant Examiner*—Joshua Lohn
(74) *Attorney, Agent, or Firm*—K. David Crockett, Esq.; Crockett & Crockett (57) ABSTRACT

A system and method for recording, storing, transferring and viewing trace data from a processor with an embedded trace macrocell. The system provides for compression of repetitive trace records using an algorithm which identifies compressible trace record streams, creates a highly compressed processed trace record stream and stores the processed trace record stream in trace RAM. Thereafter, the processed trace record stream may be transferred to a host computer, expanded and displayed or printed for analysis.

13 Claims, 6 Drawing Sheets

| STATE | STS | DATA | TIMESTAMP |
|---|---|---|---|
| -0050441 | BE+TS | E0 | +40 ns |
| -0050440 | IE | 81 | +40 ns |
| -0050439 | IE | 80 | +40 ns |
| -0050438 | WT | 80 | +40 ns |
| -0050437 | WT | 40 | +40 ns |
| -0050436 | TD | 81 | +40 ns |
| -0050435 | TD | 81 | +40 ns |
| -0050434 | TD | 81 | +40 ns |
| -0050433 | TD | 81 | +40 ns |
| -0050432 | TD | 81 | +40 ns |
| -0050431 | TD | 81 | +40 ns |
| -0050430 | TD | 81 | +40 ns |
| -0050429 | TD | 81 | +40 ns |
| -0050428 | TD | 81 | +40 ns |
| -0050427 | TD | 81 | +40 ns |
| -0050426 | TD | 81 | +40 ns |
| -0050425 | TD | 81 | +40 ns |
| -0050424 | TD | 81 | +40 ns |
| -0050423 | TD | 81 | +40 ns |
| -0050422 | TD | 81 | +40 ns |
| -0050421 | TD | 81 | +40 ns |
| -0050420 | TD | 81 | +40 ns |
| -0050419 | TD | 81 | +40 ns |
| -0050418 | TD | 81 | +40 ns |
| -0050417 | TD | 81 | +40 ns |
| -0050416 | TD | 81 | +40 ns |
| -0050415 | TD | 81 | +40 ns |
| -0050414 | TD | 81 | +40 ns |
| -0050413 | TD | 81 | +40 ns |
| -0050412 | TD | 81 | +40 ns |
| -0050411 | IE | 81 | +40 ns |
| -0050410 | TD | 81 | +40 ns |
| -0050409 | TD | 81 | +40 ns |
| -0050408 | TD | 81 | +40 ns |
| -0050407 | TD | 81 | +40 ns |

FIG. 4

| STATE | STS | DATA | TIMESTAMP |
|---|---|---|---|
| -0000564 | BE+TS | E0 | -40 ns |
| -0000563 | IE | 81 | -40 ns |
| -0000562 | IE | 80 | -40 ns |
| -0000561 | WT | 80 | -40 ns |
| -0000560 | WT | 40 | -40 ns |
| -0000559 | TD | 80 | -40 ns |
| -0000558 | IE | 44 | -41.840 us |
| -0000557 | IN | 01 | -960 ns |
| -0000556 | IE | 07 | -4.440 us |
| -0000555 | BE+TS | 88 | -40 ns |
| -0000554 | IE | 88 | -40 ns |
| -0000553 | IE | 80 | -40 ns |
| -0000552 | WT | 80 | -40 ns |
| -0000551 | WT | 40 | -40 ns |
| -0000550 | TD | B0 | -40 ns |
| -0000549 | IE | 07 | -3.280 us |
| -0000548 | IN | 01 | -640 ns |
| -0000547 | IE | 19 | -12.400 us |
| -0000546 | BE+TS | B4 | -40 ns |
| -0000545 | IE | 05 | -40 ns |
| -0000544 | IE | 28 | -40 ns |
| -0000543 | TD | 28 | -40 ns |
| -0000542 | IE | 00 | -800 ns |
| -0000541 | IN | 01 | -640 ns |
| -0000540 | IE | 04 | -680 ns |
| -0000539 | IN | 01 | -80 ns |
| -0000538 | BE+TS | 81 | -40 ns |
| -0000537 | IE | 02 | -40 ns |
| -0000536 | IE | 00 | -40 ns |
| -0000535 | TD | 00 | -40 ns |
| -0000534 | IE | 0B | -7.600 us |
| -0000533 | IN | 01 | -560 ns |
| -0000532 | IE | 06 | -2.640 us |
| -0000531 | IN | 01 | -560 ns |
| -0000530 | IE | 06 | -2.640 us |
| -0000529 | IN | 01 | -560 ns |
| -0000528 | IE | 06 | -2.640 us |

FIG. 5

TRACE REPORTING METHOD AND SYSTEM

This application is a continuation of U.S. application Ser. No. 10/095,545 filed Mar. 11, 2002, now U.S. Pat. No. 6,615,371.

FIELD OF THE INVENTIONS

The methods and systems described below relate to the field of hardware and software development.

BACKGROUND OF THE INVENTIONS

The methods and systems described below provide for faster troubleshooting and debugging of hardware and software systems which are implemented with processors built with associated embedded trace macrocells. The embedded trace macrocell (ETM) is a relatively recent addition to processors, and its function is to provide information regarding the processor execution (for example, step-by-step functioning in the processor) to a separate device specifically designed to communicate with the embedded trace macrocell and collect the data. The collected data is transmitted from the ETM, through a trace port and trace port connector, to a trace port analyzer and then to a computer workstation so that a system developer can view an on-screen display or printout of the step-by-step operation of the processor. By viewing the report of the processor operation, the system developer can determine if the system is operating properly, and, if not, the system developer can determine exactly what steps of the processor operation are responsible for any improper operations. The system developer can view the trace information using software referred to as a software debugger, and can use the same software to configure the trace port and otherwise interact with the processor, ETM, and trace port. Analysis of the trace information can reveal problems with software executing on the processor which can be addressed by modifying the software.

Though the methods and systems may be used with any processor with an embedded trace macrocell, they were developed and are illustrated here in reference to the ARM7, ARM9 and ARM10 families of processors which include an embedded trace macrocell. The ARM embedded trace macrocells can collect and transmit trace data from their associated processors, as well as associated run control signals (the run control signals are provided through the test controller (JTAG) to set up, initiate, and control the operation of the processor). The ETM signals include pipeline status signals (PIPESTAT) which provide a cycle-by-cycle indication of what is happening in the execution stage of the processor, a trace sync signal (TRACESYNC) which indicates the start of a group of substantive signals, and trace packet signals (TRACEPKT) which are substantive signals which provide information regarding the state of the processor (such as identifying the instruction being performed by the processor). The trace packet signals carry trace packets, and may be 4 bits, 8 bits, or 16 bits in length, although the trace packets themselves are typically 8 bits in length. For every cycle of processor operation, a full ETM trace record or message is transmitted to the trace port, and this information is processed and transmitted by an external trace port analyzer which records the transmissions, and stores them for subsequent examination by the host-based debugger (the number of records stored is limited by the size of RAM in the trace port analyzer).

The amount of information that can be displayed to the operator depends on how much memory can be used to store the trace information. Random access memory in the trace port analyzer (we will refer to it as the trace port RAM, to distinguish it from the various other memories in the system) is used for storing trace information prior to communicating the information to the workstation. The trace port RAM is typically 500,000 storage locations to 2,000,000 storage locations. Typically, the trace port RAM is limited to storing one instruction (or a portion of an instruction) per RAM location. Thus, all the trace information in the trace port RAM represents just a split second of operation for a typical embedded processor. (In an ARM processor running at 100 MHZ, over one gigabit of trace information is generated every second.) If the trace port RAM overflows, the system must discard the oldest stored trace information (operating as FIFO memory), stop the processor (referred to as overflow stalling) or discontinue tracing until the trace port RAM is emptied. This occurs even if the branching is not fully reported and full address information is not transmitted where it is redundant. The disadvantage to this system is that only very short periods of time can be reflected in the trace listing eventually presented to the system developer, so that a particular software bug can be difficult to isolate.

SUMMARY

The systems and methods described below provide for recording, storing, transferring and viewing trace data from a processor with an embedded trace macrocell. The system provides for compression of repetitive trace records using an algorithm which identifies compressible trace record streams, creates a highly compressed processed trace record stream and stores the processed trace record stream in trace RAM. Thereafter, the processed trace record stream may be transferred to a host computer, expanded and displayed or printed for analysis.

The trace data is obtained from an ETM in the form of a stream of trace records, which we refer to as the reported trace record stream. This reported trace record stream is then compressed, according to compression algorithms, and stored in trace RAM. We refer to the record stream generated by the algorithm as the processed record stream. This processed record stream is then transferred to a host computer, and the host computer, using decompression software implementing an algorithm which reverses the compression algorithm, substantially reconstructs the original reported trace record which was reported by the ETM. We refer to this record stream as a reconstructed record stream. Because the reported record stream is highly compressed before being stored in the trace RAM, system developers can capture a much larger stream, which makes isolation of software bugs much easier.

Compression is accomplished through a trace data processor, such as a CPLD designed to implement a compression algorithm. The compressed, processed record stream is decompressed using software on the host computer. The decompression software implements an algorithm which is a reverse of the compression algorithm. Two distinct compression algorithms exemplify the compression method. One compression method will result in high compression ratios when the reported record stream includes large blocks of records comprising trace records of a single type (in addition, possibly, to trace records which may be deleted or ignored). This method recognizes a stream of compressible records by their type (using PIPESTAT signal, for example) and counts the number of successive records encountered in the stream, and then creates a processed trace record reporting the type of record encountered, and the number of successive records of that type encountered without interruption or intercession of a record of another compressible or non-compressible type (though they may be interrupted by certain types of trace records which themselves are deleted from. Another compression method will result in relatively higher compression ratios when the reported record stream includes many compressible trace records, but those records are of varying type. This method recognizes a stream of compressible records by their type (using PIPESTAT signal, for example). Recognizing that these records contain a meaningful PIPESTAT signal and meaningless or low-value data in the data packets, the method copies the meaningful data (typically, only the PIPESTAT signal is meaningful) of several reported trace records into a single processed trace record. Thus, trace records of several different types may be compressed into the same processed trace record. The compression algorithms may be selected by the operator of the system, depending on the expected quality of the reported trace record, or it may be selected by the system, automatically, depending on the actual trace records encountered.

DETAILED DESCRIPTION OF THE INVENTIONS

Figure 1:
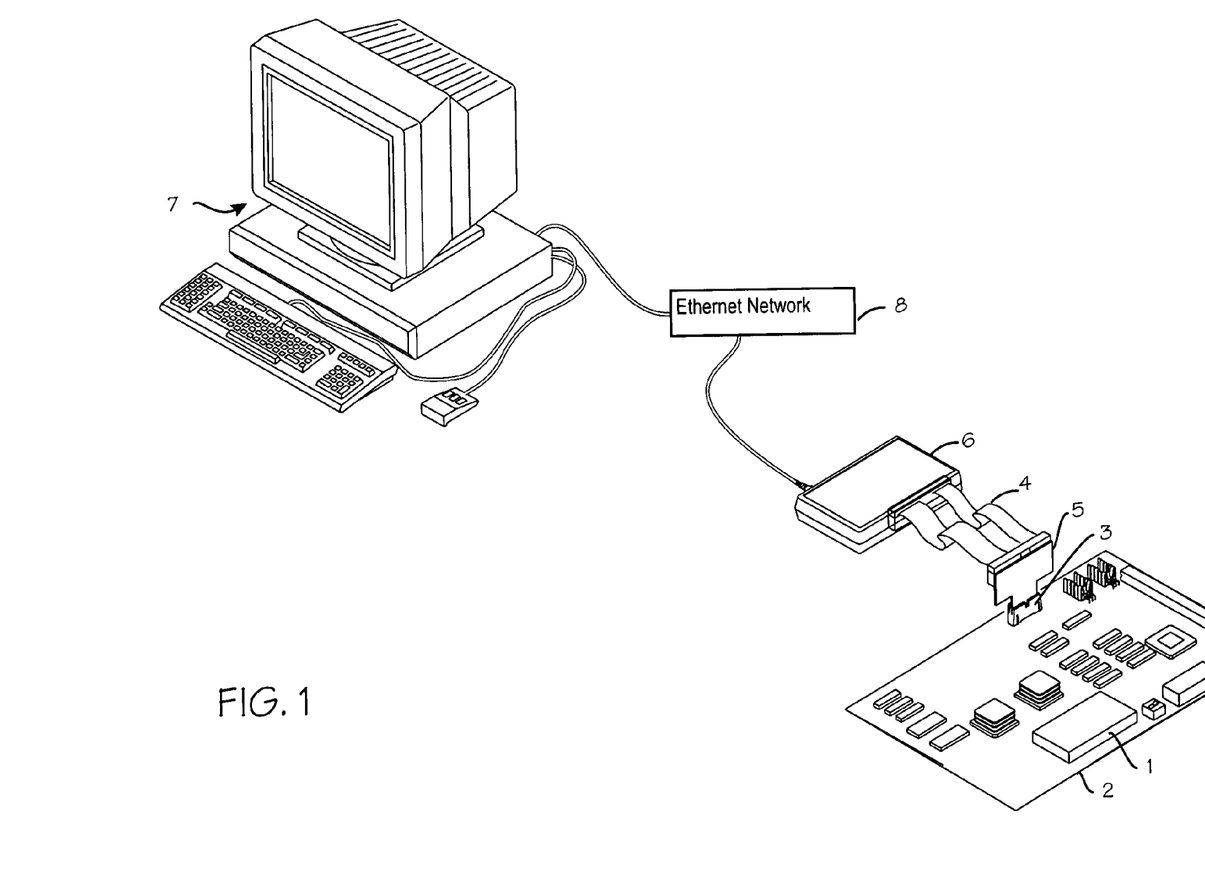
FIG. 1 shows the entire system in which the methods and systems are used.

FIG. 1 shows the entire system in which the methods and systems are used. The target device includes an integrated circuit 1 (containing one or more processors) on a circuit board 2. The integrated circuit and circuit board may be adapted for use in any number of devices, including cell phones, internet appliances, digital signal processors, automobiles, PDA's and computers. The integrated circuit includes an embedded trace macrocell which is connected to the trace port connector 3 which provides a physical connection to a communications cable 4 through PBD buffer board 5. The communications cable is used to transmit data back and forth between the circuit board components and the trace port analyzer 6 which includes the necessary hardware for reading the trace port information, processing and compressing it, storing it, and, upon demand, transmitting the trace port information to the workstation. The trace port analyzer also includes a JTAG interface unit needed to control the processor(s) from the workstation. The trace port analyzer also includes hardware and software for accomplishing the compression method described below. Other functions of the trace port analyzer include conventional run control. The trace port analyzer outputs trace information to the host computer 7 through an ethernet network 8. Finally, the host computer is used by the system developer to view the trace information, and also to set-up and initialize the target device and control the device to initiate operations for which the developer want to collect trace information.

Figure 2:
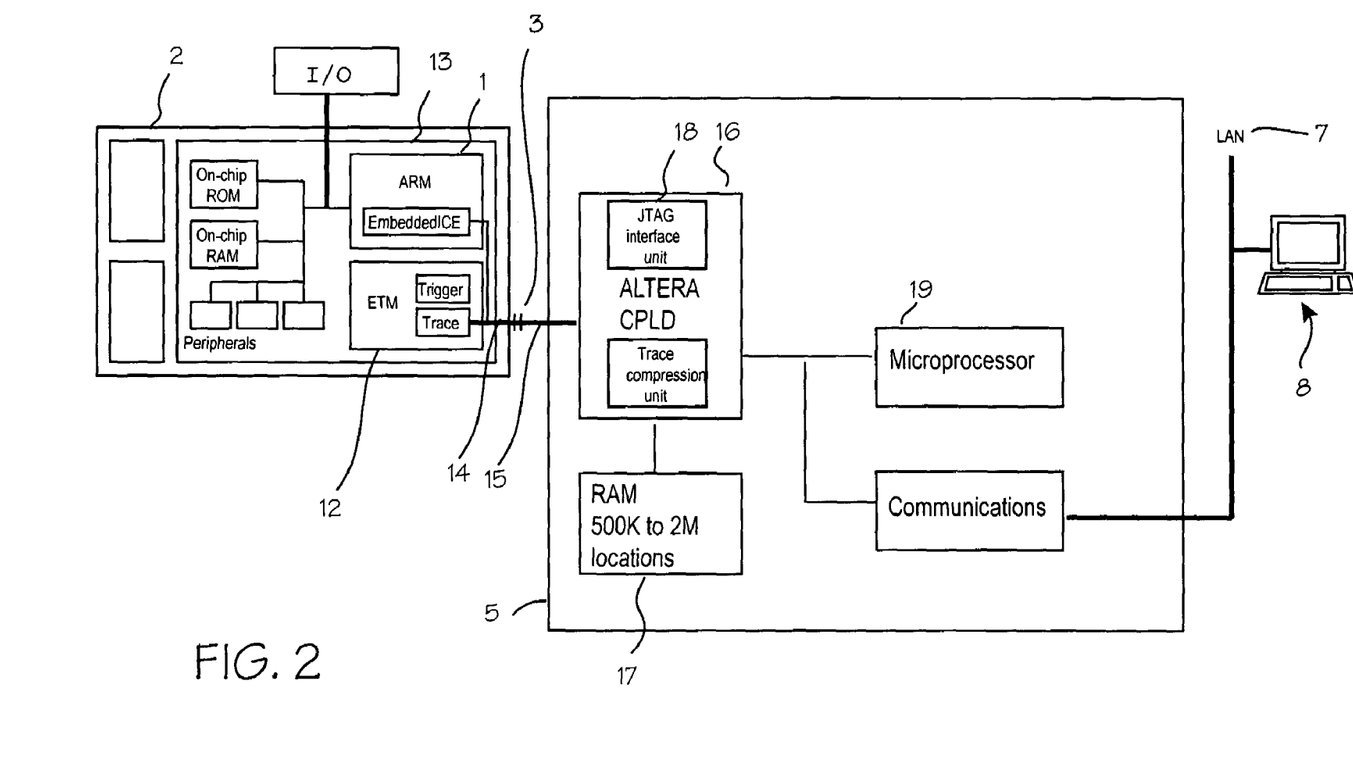
FIG. 2 is a schematic of the system.

FIG. 2 is a schematic of the system. The circuit 1 (comprising, for example, an ARM processor) and embedded trace macrocell 12 are part of the same integrated circuit chip 13, mounted on the circuit board 2. The integrated circuit may be a complex device referred to as a system-on-a-chip, and may include on-chip ROM, on-chip RAM, the processor, Embedded ICE circuit, and the embedded trace macrocell, and perhaps several other devices. The processor circuit is labeled as an ARM processor, but may be other processors, and may include two or more processors. This processor is the "target" processor, meaning that it is the target of the debug activity.

The embedded trace macrocell has a trace port 14 which is connected to the trace port connector 3, and is further connected to the trace port analyzer 6 and connected through the pipeline 15 to an input/output port of the Complex Programmable Logic Device (CPLD) 16. The ETM communicates with the CPLD in an ARM proprietary format. The CPLD functions as the trace capture hardware, and converts the trace port signals into a form that the host computer and debugger can access (such as ethernet packets). It is also programmed to perform as a Trace Compression Unit, capable of performing the compression methods described below, and output compressed trace information to the trace RAM 17 and thereon to the workstation 9. It may be referred to generally as a trace data processor, and it may be represented as a single unit or as two or more discrete functional circuits. The ETM constitutes a means for trace record reporting, and other embodiments of trace data reporters, operable as means for reporting trace records from the processor to off-chip hardware, may be used in its place to provide trace data useful in the method and system for compressing trace data. The CPLD is merely the current optimum device for implementing the trace capture function and the trace compression algorithm, and these trace record processing functions can be performed with other forms of trace processing hardware including circuits, processors, full custom integrated circuits, FPGA's, standard cells, or discrete logic systems designed to implement the compression algorithm. These devices are either programmed to perform the compression algorithm, or the compression algorithm is hardwired into the design of the device; in either case, we use the word "designed" generally to refer to modifications made to the trace processing hardware, whether through hardware or software or a mix of the two, that enable the trace processing hardware to perform the compression algorithm.

The trace memory is referred to as trace RAM, and is provided in the form of four static ram chips, but again, any form of memory can be used for the trace memory, provided it is fast enough to be operable within the system. The communications block comprises 10/100 base T ethernet ports or USB ports and associated hardware designed to coordinate communications between the trace port analyzer and the host computer. The JTAG interface unit 18, housed within the trace port analyzer and, in this embodiment, provided within the CPLD, connects the workstation to the ARM processor through an industry standard JTAG interface and communications protocol. Through the JTAG interface, the workstation may be used to control the ARM processor, including such functions as starting and stopping the processor at points on interest, setting breakpoints at which the processor is to stop, downloading code into the target system, installing or downloading a state of operation onto the processor so that a test starts at a particular state, and stepping the processor through its operation one instruction at a time, and displaying and modifying memory. Again, the JTAG interface unit may be replaced with other interface hardware or target processor control means. A trace analyzer microprocessor 19 is used to control operations of the trace analyzer, including communications with other components.

Figure 3:
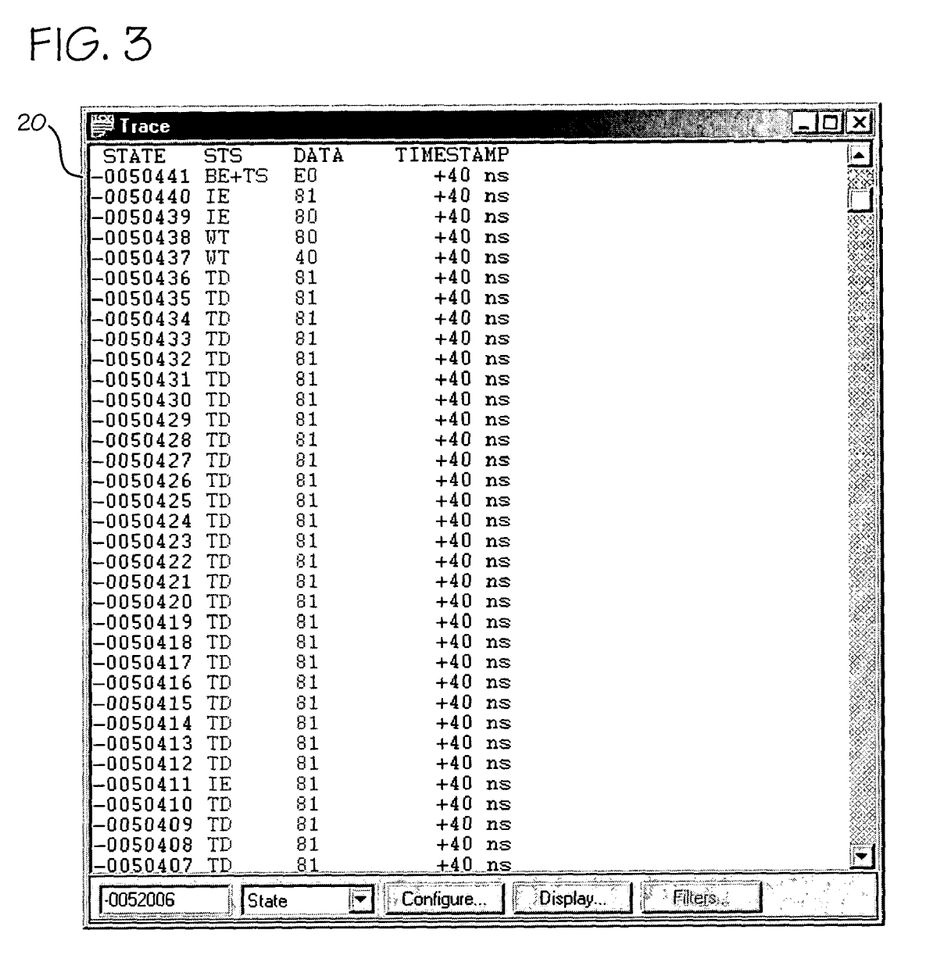
FIG. 3 is an illustration of typical trace data provided an embedded trace macrocell.

FIG. 3 is an illustration of typical trace data provided by an embedded trace macrocell. This data is taken from an actual trace. The trace data is illustrated in tabular form corresponding to a typical trace window format used for presentation of trace data on the host computer. This reported trace record will not be recovered and stored in normal operation (the goal is to avoid collected the entire reported trace), but this reported trace was collected from a target system to illustrate the compression algorithm. The trace window 20 displays trace record data in tabular form with a column for the state, which is a count of the storage location, counted backwards from the point at which the trace it stopped, the PIPESTAT column labeled STS, a data column related data in the trace record, and a timestamp column indicating the incremental time between trace records.

The trace record stream underlying the display of FIG. 3 is quite lengthy, and is summarized as:

| | | | |
|---|---|---|---|
| −0050441 BE + TS | | E0 | +40 ns |
| −0050440 IE | | 81 | +40 ns |
| −0050439 IE | | 80 | +40 ns |
| −0050438 WT | | 80 | +40 ns |
| −0050437 WT | | 40 | +40 ns |
| −0050436 TD | | 81 | +40 ns |
| * | | | |
| * 1046 traces, comprising interspersed IE and TD trace records | | | |
| * | | | |
| −0049390 TD | | 81 | +50 ns |
| −0049389 IN | | 81 | +40 ns |
| * | | | |
| * | | | |

Between the records −0050436 and −0049389, 1047 trace records were reported. These consisted of IE trace records interspersed with TD trace records. The first TD record, numbered −0050436, is used by the compression algorithm to indicate that the following trace records, if they have pipe status indicating that they are compressible, should be compressed. The following 1047 trace records will be compressed into a single record, and compression of IN records starts upon encountering the IN record at −0050436.

The ETM signals include pipeline status signals (PIPESTAT) which provide an indication what is happening in the execution stage of the processor, a trace sync signal (TRACESYNC) which indicates the start of a group of substantive signals, and trace packet signals (TRACEPKT) which are substantive signals which provide information regarding the state of the processor (such as identifying the instruction being performed by the processor). In this illustration (FIG. 3), an 8-bit trace packet is provided by the embedded trace macrocell (the ETM may be configured to provide 4 bit, 8 bit, or 16 bit trace packets). Thus, each ETM signal in this example comprises 8, 12 or 20 bits of data, including the three bits of pipe status information (PIPESTAT), 4, 8 or 16 bits of data reporting the state of the processor, and a one-bit TRACESYNC signal. For a large class of operations, the information is predictably redundant, of little interest, or actually comprises no information at all. For example, not all records contain data. Records that do not contain data will have values presented on the data wires, and thus values communicated in the trace packets, that are unpredictable and not useful. Thus, compressible information includes repetitive pipe status information and trace records with no data. Thus, in FIG. 3, the repetitive pipe status information appears in all the records in the range −0050436 to −0049390. These have no data within the TRACEPKT signals because they are "execute only" instructions. Though the term pipeline status is currently used only in connection with the ARM ETM (as there is no other available processor with an ETM), the term is used here to mean both the particular pipeline status signals used by the ARM ETM and any other signal used to communicate the state of the processor. More generally, the term processor state indicator is used to denote any signal included in a trace record to fulfill the function of the pipeline status signal.

The packets which are compressible and non-compressible under the method disclosed herein are identifiable by the PIPESTAT portion of the trace record. Records provided by the ETM Version 1 may have PIPESTAT messages (comprised of three bits) of IE (instruction executed), ID (instruction with data), IN (instruction not executed), WT (wait), BE (branch executed), BD (branch with data), TR (trigger) and TD (trace disabled). Of these, the IE and IN are often repetitive, predictably empty of data, or both. Thus, they may be compressed. To compress these records, the Trace Compression Unit is programmed to identify IE trace records, count the number of successive IE trace records, and send a single record to the trace port RAM indicating the IE records were transmitted from the ETM, and the number of successive IE records. Likewise, the Trace Compression Unit is programmed to identify IN trace records, count the number of successive IN trace records, and send a single record to the trace port RAM indicating that IN records were transmitted from the ETM, and the number of successive IN records.

Records provided by the ETM Version 2 may have PIPESTAT messages of IE, DE, IN, DN, WT, DW, TR, TD, PTIE, PTDE, PTIN, PTDN, PNIE, PNDE, PNIN, and PNDN. Version 2 PIPESTAT messages IE, IN, PTIE and PNIN are often predictable and repetitive, and a plurality of these records may be compressed into a single record indicative of the PIPESTAT and the number of consecutive records carrying the PIPESTAT.

Also, the data included in a TD trace record is never valid and is not of interest. Thus, most TD (trace disabled) records may be disregarded completely, and not reported at all. They constitute trace records susceptible to deletion or filtering from the trace record stream. TD records encountered within a stream of compressible record are deleted (no corresponding trace record or other indication is included in the processed trace record).

Thus, the compression algorithm may identify compressible records, non-compressible records, and records which may be deleted, by the pipe status information of each record. The algorithm may be applied to compress preselected groups of trace records, by on pipe status, to pass other pre-selected groups of trace records to the trace RAM uncompressed, and filter out or delete another group of trace records. While in the ARM trace data format, the groups are readily identifiable through the predetermined format of pipe status information, other formats may be developed by others with differing formats, yet the compression algorithm can be applied to such systems so long as the trace data is subject to analysis and identification in a trace data processor analogous to the CPLD.

Figure 4:
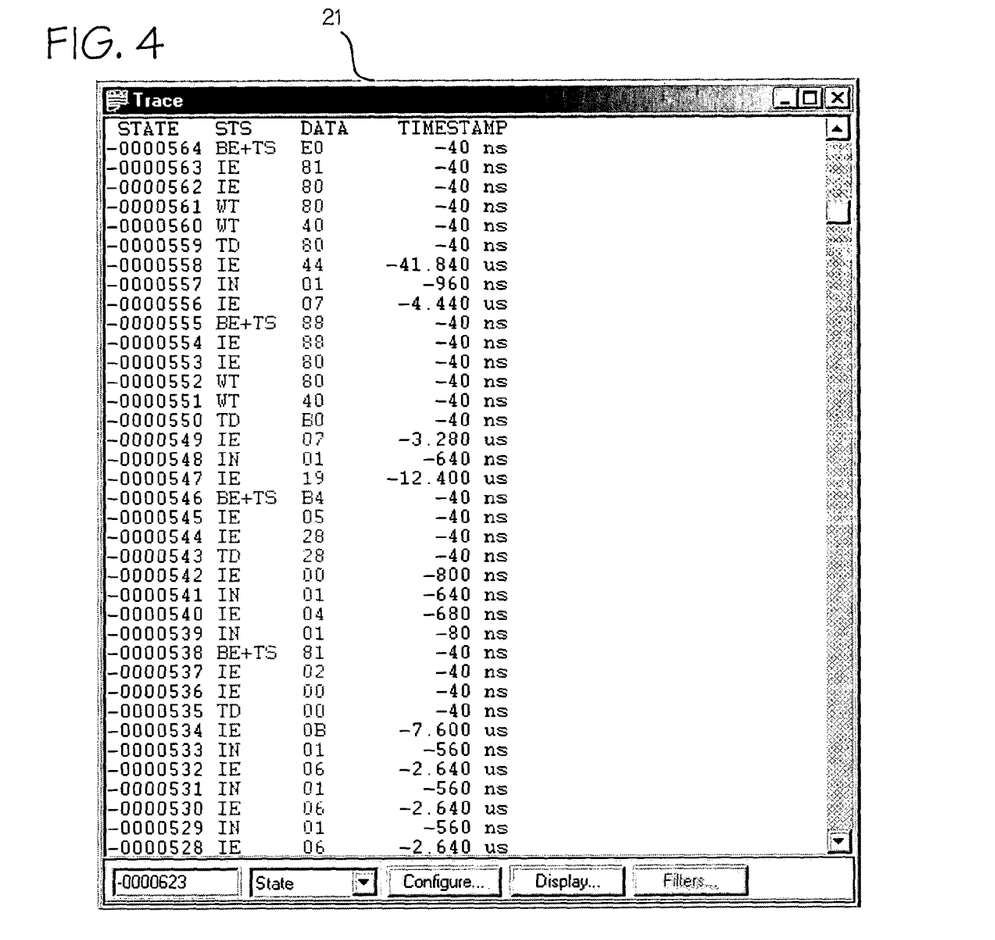
FIG. 4 is an illustration of typical compressed trace data provided by the large group compression method.

FIG. 4 is an illustration of typical compressed trace data provided by the compression method. The compressed data is stripped of the repetitive and predictable data such as pipe status information, empty packets, and execute only instructions, and is stored in the trace RAM. The processed trace window 21 includes the same tabular format and column labels as the trace window shown in FIG. 3. The records at state numbers −564 through −560 have been processed into records identical to the records at state numbers −50441 through −50437. The first encountered TD trace record reported at −50436 is also processed into an identical processed record, stored at −559. The following stream of IE trace records (interspersed with many TD records, but no other records (this stream actually starts with a TD records) starting at −50435 and ending at −49390 is processed into record −558. Processed record −558 includes the PIPESTAT IE, and in the data field it contains the indication that 68 (44hex) IE records were counted, having been encountered successively, except for TD trace records, before a non-IE trace record was encountered. This represents the 1047 records in the original reported stream, and as the time stamp indicates, the stream spanned a period of 41.840 microseconds. The following processed trace record −557 corresponds to the single IN record reported at −0049389. The next several processed trace records, −555 through −550, represent a complete address report in the reported trace record stream (again, this is not compressed). The following record −549 represents 7 (07hex) IE trace records in the reported trace record stream. Processed record −534 represents a reported stream of 11 (0Bhex) reported IE trace records.

Figure 5:
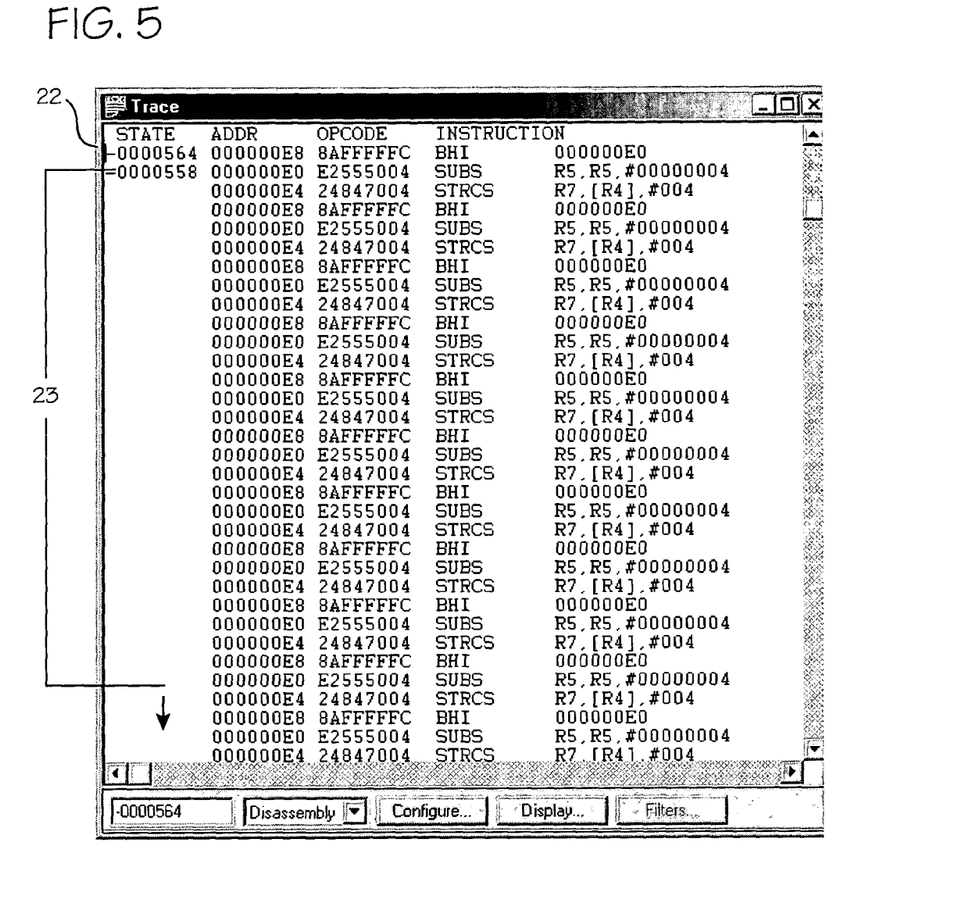
FIG. 5 is an illustration of a trace listing presented to the operator.

The trace information is eventually presented on the workstation display as a listing of executed instructions and data accesses, and may also have links to the high-level source code that is readily understood by the system developer. FIG. 5 illustrates the trace record reconstructed from the processed trace record stream of FIG. 4. The reconstructed trace record stream is presented to the system operator in the display window 22, which presents a column for the state, address (indicated where the instruction was fetched), opcode and instruction. As shown in the listing, the record corresponding to state −558 has been reconstructed into the block of records indicated partially by the bracket 23. The entire reconstructed listing is identical to the reported trace record stream illustrated in FIG. 3, except that no TD's are inserted into the reconstructed record stream. This trace record is much longer than the window, and the portion of the reconstruction corresponding to records −564 through −542 contains 113 reconstructed trace records. (The corresponding process trace record contained only twenty-three records.)

This listing is reconstructed from numerous processed trace records that were reported in compressed form from the CPLD to the trace RAM and retrieved and reconstructed by the host computer. The processed trace records may be copied to the host computer and stored on the host computer, in compressed form, for further processing by the computer. The host computer is programmed to retrieve the processed trace records, reconstruct or expand them according to an algorithm which reverses the compression algorithm, and store, print or display (we will use the term "store" to encompass any method of storing, displaying, printing, or otherwise presenting or communicating the reconstructed trace record) the reconstructed trace records in a listing which may be analyzed by the system developer. The reconstructed trace listing is a complete reconstruction of the trace records reported by the ETM to the trace port and received by the CPLD (unless the CPLD is configured to discard TD records, in which case the reconstruction is complete except for the loss of TD records). However, the trace record has been stored and retrieved from the trace RAM, which is much smaller than the reported or reconstructed stream of trace records.

The Large Group Compression Algorithm

The system identifies the repetitive and predictable information and compresses it at identifiable points in the trace record stream. When tracing is initiated (after a triggering event), the trace records are stored as they are received from the ETM trace port, in an uncompressed state. All trace records are stored in the trace RAM until a trace record with a pipe status of TD is encountered. The first TD record is recorded in the trace RAM, and the trace processing hardware then enters a compressed reporting mode in which it compresses records as related below. "Compressed reporting mode" means that identifiable pluralities or groups of trace records are reported and stored in a smaller number of trace RAM records. Compressed processing continues until a record with a pipe status other than IE or IN or TD (version 1), IE, IN, PTIE, PNIN or TD (version 2) is received by the trace processing hardware, at which point all the incoming trace records are stored as they are received from the ETM trace port, in an uncompressed state, until, once again, a TD record is encountered, at which point the trace processing hardware records the TD record in trace RAM and re-entered a compressed reporting mode.

The compressed reporting mode may be implemented according to the following algorithm:

For each IE trace record received from the ETM by the trace processing hardware, which is followed by an IE or a TD, the trace processing hardware counts the accumulated IE's without reporting and storing any records to the trace RAM, until a maximum of 256 successive IE's have been received (without receiving a non-compressible record), and then reports a single proxy trace record, in the same format as all other trace records, with an IE pipe status and data in the trace packet fields indicating the number of counted IE records (the "count"). (TD trace records may be ignored and essentially discarded or filtered from the trace record stream conveyed from the ETM to the trace RAM, or retained and reported). Thus, accumulation and counting of IE trace records stops at 255, or when a non-IE trace recorded is encountered, whichever occurs first.

If the algorithm is implemented for ETM version 2, each IE trace record received is recorded as a single instance or count of an IE record, while each PTIE trace record received is recorded as two instances or counts of IE, if these records are followed by an IE, a PTIE (and, if desired, a TD trace record). The IE and PTIE records received from the ETM by the trace processing hardware are compressed and reported and stored in the trace RAM as single records with IE pipe status and count information in the trace packet fields. Successive and interspersed IE and PTIE records may be counted in the same stream of processed records, such that a stream of say, x IE trace records followed by y PTIE records followed by z IE records is counted and records as x+2y+z successive IE trace records.

For each IN trace record received from the ETM by the trace processing hardware, which is followed by an IN or a TD, the trace processing hardware counts the accumulated IN's without reporting and storing any records to the trace RAM, until a maximum of 256 successive IN's have been received (without receiving a non-compressible record), and then reports a single proxy trace record, in the same format as all other trace records, with an IN pipe status and data in the trace packet fields indicating the number of counted IN records (the "count"). (TD trace records may be ignored and essentially discarded or filtered from the trace record stream conveyed from the ETM to the trace RAM, or retained and reported). Thus, accumulation and counting of IN trace records stops at 255, or when a non-IN trace recorded is encountered, whichever occurs first.

If the algorithm is implemented for ETM version 2, each IN trace record received is recorded as a single instance or count of an IN record, while each PNIN trace record received is recorded as two instances or counts of IN, if these records are followed by an IN, a PNIN (and, if desired, a TD trace record). The IN and PNIN records received from the ETM by the trace processing hardware are compressed and reported and stored in the trace RAM as single records with IN pipe status and count information in the trace packet fields. Successive and interspersed IN and PNIN records may be counted in the same stream of processed records, such that a stream of say, x IN trace records followed by y PNIN records followed by z IN records is counted and records as x+2y+z successive IN trace records.

In differing implementations, the TD trace records received from the ETM may be filtered from the trace stream reported from the trace processing hardware to the trace RAM, or they may be treated as repetitive trace records without data, as above, or they may be treated as uncompressible trace records. If TD trace records are to be ignored or filtered from a compressible stream, trace records received from the ETM with a pipe status of TD are ignored if they are reported following an IE trace record or an IN trace record, an no non-IE or non-IN trace record is reported intermediate the IE trace record or an IN trace record and the following TD trace record, and no corresponding processed trace record is stored in the trace memory.

This method is accomplished in the CPLD, which is programmed to identify repetitive and predictable information and replace it with information relating, in short form, the data that has been removed. In this manner, the amount of data that must be transmitted and stored in various components can be typically be reduced by a factor of 10 to 1. If, for example, the system developer wants to retrieve and analyze 3 million instructions, this may be accomplished with 300,000 storage locations instead of 3 million storage locations in an uncompressed state.

The host computer is provided with software which is operable, in conjunction with the host computer, to retrieve the processed trace records which have been compressed according to the compression algorithm, identify the records which constitute reports of multiple original records, and reconstruct a trace record stream which is a substantial duplicate of the original trace record stream. If some records (such as TD records) have been filtered or deleted, the reconstructed trace record stream will not be reconstructed so as to perfectly correspond to the original trace records stream. However, whether some records are deleted or not, the software substantially reconstructs the original record stream. The stream presented to the system developer provides a trace record stream much larger than could otherwise be accommodated if trace records were stored, verbatim, in the trace RAM. The host computer may be provided in several forms. As indicated above, it is most conveniently provided as a typical personal computer or workstation, since the time necessary to decompress the processed trace record stream is not critical. However, the host computer can perform the decompression algorithm through an additional trace data processor, which, as with the trace compression, may be implemented in various devices. That is, the trace record decompression algorithm can be performed with a CPLD or other trace processing hardware in the form of circuits, processors, full custom integrated circuits, FPGA, standard cells, or discrete logic systems designed to implement the decompression algorithm. The trace processing hardware used for decompression can be housed in the host computer or in the trace port analyzer, and the trace decompression can be performed before transmission to the host computer (so that a reconstructed trace record is transmitted to the host computer) or after transmission to the host computer.

Small Group Compression Algorithm

The compression method described above may result in high compression ratios for many expected trace record streams. However, in some trace records, the number of successive compressible trace records, such as IE trace records provided by the ARM ETM, may be small, leading to a low compression ratio. For such streams, a different compression algorithm will provide a higher compression ratio. In this algorithm, which we will refer to as a small group compression algorithm, small groups of consecutive compressible trace records are identified and compressed into processed trace records at a compression ratio of about six to one (for a system using twenty bit traces). The choice of compression algorithm may be applied automatically, or it may be applied at the discretion of the system developer, depending on the expected quality of the trace record stream, and can be selected through the debugger software interface in the host computer.

In the small group compression algorithm, the trace data processor is programmed to identify a series of consecutive compressible trace records (for example, IE trace records following and TD trace record) and create a processed trace record which includes the pipeline status of the first IE trace record, and in the data bits (which are meaningless for these records), the pipeline status for the next several compressible trace records (IE trace records, for example), until the processed trace record is full. In a twenty-bit process trace record, six successive three-bit IE trace records can be reported. If there are more than six IE trace records in succession, the trace data processor creates an additional trace record, with the IE pipeline status in the pipeline status bits and the data bits, until a non-compressible trace record is encountered. When a non-compressible trace record is encountered prior to filling a processed trace record, the trace data processor enters the corresponding pipeline status signal (ID, for example) in the next data field to indicate the end of the compressible stream, and then creates the next processed trace record as a duplicate of the encountered non-compressible trace record. If a non-compressible record it encountered after filling a processed trace record, the trace data processor creates a processed trace record that is a duplicate of the encountered non-compressible trace record.

Figure 6:
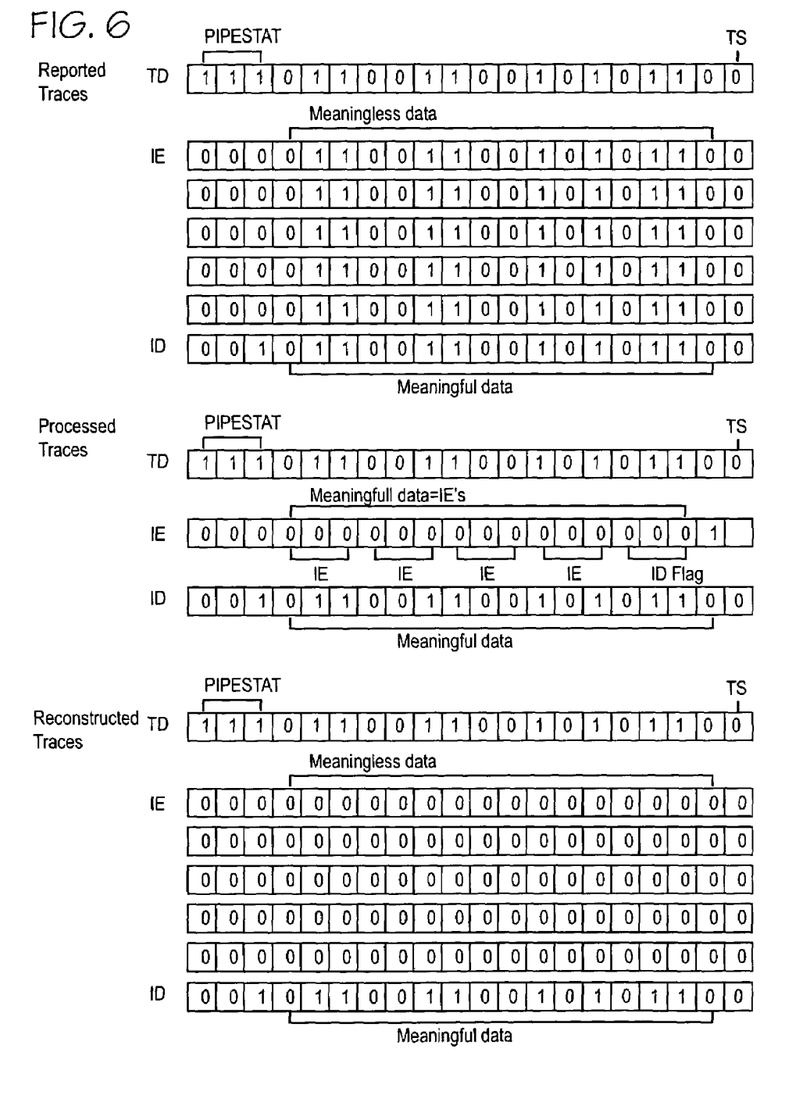
FIG. 6 is illustrates the trace record compression achieved in a small group compression method.

FIG. 6 illustrates aspects of the small group compression algorithm. A series of five IE trace records immediately following a TD trace record will be reported by the trace reporter as one complete TD record and five records each having three bits of valid pipeline status information and 16 bits of empty or meaningless information, but would be compressed into one complete TD record followed by one complete processed record having five three-bit signals indicative of an IE trace record. This is illustrated in FIG. 6, in which the first block of trace records, labeled as reported traces is illustrated by the sequence of one TD record followed by five IE records. The compression ends when a non-IE trace record is reported by the trace reporter, in which case, if the current trace record is not yet filled, the pipeline status will be entered in the processed trace record, and the next trace record will be a copy or the original reported non-IE trace record. This is illustrated by the ID trace record shown at the end of the reported trace records. The block of processed trace records shown in FIG. 6 shows how this hypothetical reported trace record stream is compressed: the TD trace record followed by a series of five IE trace records immediately followed by an ID trace record will be reported by the trace reporter as one complete TD record, five records each having three bits of valid pipeline status information and 16 bits of empty or meaningless information, and one ID record with meaningful data. This would be compressed into the block of trace record labeled as processed trace records, which includes one complete TD record followed by a single complete processed record having five three-bit signals indicative of an IE trace record and a three-bit signal indicative of the ID trace record, followed by one complete ID trace record.

If numerous IE trace records are reported in succession, they are compressed into groups of six, so that six reported IE's are represented in the processed record stream by one processed IE record containing five IE signals in the trace data packet locations. Thus, a series of twelve IE trace records immediately following a TD trace record will be reported by the trace reporter as one complete TD record and twelve consecutive records each having three bits of valid pipeline status information and 16 bits of empty or meaningless information, but would be compressed into one complete TD record followed by two complete processed records, each having six three-bit signals indicative of an IE trace record.

The small group compression algorithm, like the large group compression algorithm, is applicable to IN trace records in ARM ETM version 1, and IN, IE, PNIN, and PTIE trace records in ARM ETM version 2. However, IN, IE, PNIN, and PTIE records may be compressed together into a single record. That is, a single processed record may contain information for several successive compressible records of different pipe status. Additionally, TD trace records encountered after compression starts, and before a non-compressible trace record is encountered, may be ignored or filtered from the processed trace record stream. Thus, a stream of records comprising compressible trace records interspersed with TD trace records is compressed into processed records with no signal corresponding to the TD records. For other implementations of the ETM, the processor status signals chosen by the manufacturers of those systems can be used correspondingly.

To decompress the compressed, processed trace record stream, the host computer is provided with software which will expand the trace record stream using a reverse algorithm to substantially reconstruct the original reported record stream (if TD records are not discarded, the reconstruction will be complete). Thus, the system developer is presented with a reconstructed trace record stream which conveys all the information of the original record stream, but has be stored in trace RAM having only a fraction of the size necessary to store the entire trace record stream.

EXAMPLE

A typical cell phone processor activity helps to illustrate the potential compression under this method. If a system developer is attempting to capture trace records for cell phone processor to observer the processor behavior in response to a given condition, the trace information will include numerous operations prior to and after the condition is achieved. The condition might be, for example, entry of the digits 9-1-1 onto the keypad, and the operator may want to ensure that the processor responds properly to this input. While this input is being provided, either through an actual keypad or through simulation, the processor will be continuously polling the keypad, watching for input. This polling activity comprises repetitive loops of instructions, which may total thousands of instructions. Most of these instruction will be reported as IE (instruction executed). These instructions, which may be numerous, as "compressed" into a single record containing an indication that IE records were reported and the total number of IE records that were counted. Thus, if the method is implemented without limitation on the number of counted IE which may be reported in a single record, about 1400 IE records could be compressed into a single record. The limit is 1400 with present ARM ETM architecture and protocols, because the ARM ETM will transmit a full address, comprising two to five records, every 1400 records (which corresponds to every 1400 instructions or every 1400 processor cycles). The address records report the full program counter address, and are reported with a PIPESTAT of BE with trace sync set (BE+TS). If polling were to continue without interruption, the compressed stream of traces would comprise 3 records (one IE report and two address records) for every 1400 records reported by the ETM.

As the algorithm is currently implemented, each compressed record will report at most 256 IE transmitted records in a single compressed record. Thus, in the hypothetical of 1400 repetitive IE trace records, these would be reported and stored in the trace RAM as 8 records (seven records reporting 255 IE trace records, one record reporting 130 IE trace records, and two trace records reporting the full current address of the processor).

We have described the system and method in the context of the ARM processor and its embedded trace macrocell, and various hardware such as the CPLD, RAM, and the JTAG interface unit. However, the system and method may be used with any system employing an embedded trace macrocell or other mechanism for reporting trace data, and with many versions of hardware in the various components. Thus, the various terms used to describe system hardware and other components are clearly intended as examples of hardware chosen from a wide range of options to implement the system, and not as indications that the terms or other broader terms used in their stead should be narrowly interpreted. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A system for storing trace information from a target processor, where the processor has an associated trace data reporter capable of obtaining trace data from the processor and transmitting the trace data in a stream of trace records of predetermined format to other devices, said system capable of displaying the stream of trace records on a host computer, said system comprising:
- a trace data processor operable to receive the stream of trace records from the trace data reporter, said trace data processor designed to process the stream of trace records, and store corresponding processed trace records in memory;
- Trace memory operable to store processed trace records received from the trace data processor, said trace memory being a RAM;
- wherein the trace data processor is designed to process trace records by identifying trace records susceptible to compression, create a processed trace record corresponding to said records susceptible to compression, and store said processed trace record in the trace memory;
- trace record reconstruction software executable on the host computer, said reconstruction software operable, in conjunction with the host computer, to retrieve the processed trace records stored in the trace memory and identify processed records created from records susceptible to compression, and substantially reconstruct the stream of trace records reported to the trace data processor from the trace data reporter.

2. The system of claim 1 wherein the trace data processor is additionally designed to (1) identify a plurality of groups of successive trace records susceptible to compression, and (2) create a plurality of processed trace records corresponding to a plurality of groups of successive trace records susceptible to compression, such that one processed trace record is created for each group of successive trace records susceptible to compression, and such that each processed trace record contains an identification of the trace records susceptible to compression and number successive records in the corresponding group of successive trace records having the pre-selected pipeline status susceptible to compression, and (3) store the plurality of processed trace records in the trace memory.

3. The system of claim 1, wherein the trace data processor is additionally designed to identify trace records susceptible to deletion, and to omit such records from the processed trace records.

4. The system of claim 1, wherein
the trace records are provided in a format including one or more packets providing a processor status indication, and the trace data processor is designed to identify a stream of successive records having a pre-selected processor status indication as records susceptible to compression, and to create a processed trace record having information relating to the processor status indication and the number of successive trace records comprising the stream of successive records having the pre-selected processor status indication, and store said processed trace record in the trace memory; and
the trace record reconstruction software is operable on the host computer to reconstruct the stream of successive records having a pre-selected processor status indication from the processed trace record.

5. The system of claim 1, wherein
the trace records are provided in a format including one or more packets providing a processor status indication, and the trace data processor is designed to identify a stream of successive records having a pre-selected processor status indication as records susceptible to compression, and to create a processed trace record having information relating to the processor status indication, wherein said information relating to the processor status indication is repeated in the processed trace record in correspondence to the number of successive trace records having the pre-selected processor status indication, and store said processed trace record in the trace memory; and
the trace record reconstruction software is operable on the host computer to reconstruct the stream of successive records having a pre-selected processor status indication from the processed trace record.

6. The system of claim 1 wherein:
the trace data reporter is an embedded trace macrocell and provides the stream of trace records in a format comprising pipeline status signals and trace data packets, and said pipeline status signals comprise a limited number of defined signals; and
the trace data processor is implemented in a complex programmable logic device programmed to identify trace records susceptible to compression by identifying trace records having a pre-selected pipeline status, and create a processed trace record corresponding to a plurality of successive trace records having the pre-selected pipeline status and containing an indication of the pipeline status and number successive records having the pre-selected pipeline status and store the processed trace record in the trace memory.

7. The system of claim 6 wherein the complex programmable logic device is additionally programmed to identify a plurality of groups of successive trace records having the pre-selected pipeline status, and create a plurality of processed trace records corresponding to a plurality of groups of successive trace records having the pre-selected pipeline status, such that one processed trace record is created for each group of successive trace records, and each processed trace record contains an indication of the pipeline status and number successive records in the corresponding group of successive trace records having the pre-selected pipeline status, and store the plurality of processed trace records in the trace memory.

8. The system of claim 6 wherein the complex programmable logic device is additionally programmed to provide at least one processed trace record for every 256 successive trace records having the pre-selected pipeline status, such that the maximum number of trace records reported in a single processed trace records is 256.

9. The system of claim 1 wherein:
the trace data reporter is an embedded trace macrocell and provides the stream of trace records in a format comprising pipeline status signals and trace data packets, and said pipeline status signals comprise a limited number of defined signals; and
the trace data processor is implemented in a complex programmable logic device programmed to identify trace records susceptible to compression by identifying trace records having a pre-selected pipeline status, and create a processed trace record corresponding to a plurality of successive trace records having the pre-selected pipeline status and containing an indication of the pipeline status and wherein the pre-selected pipeline status is repeated in the processed trace record in correspondence to the number of successive trace records having the pre-selected pipeline status, and store the processed trace record in the trace memory.

10. The system of claim 9 wherein the complex programmable logic device is additionally programmed to identify a plurality of groups of successive trace records having the pre-selected pipeline status, and create a plurality of processed trace records corresponding to a plurality of groups of successive trace records having the pre-selected pipeline status, such that one processed trace record is created for each group of successive trace records, and each processed trace record contains an indication of the pipeline status and wherein the pre-selected pipeline status is repeated in the processed trace record in correspondence to the number of successive trace records having the pre-selected pipeline status, and store the plurality of processed trace records in the trace memory.

11. The system of claim 9 wherein the complex programmable logic device is additionally programmed to provide at least one processed trace record for every 256 successive trace records having the pre-selected pipeline status, such that the maximum number of trace records in a group of successive trace records reported in a single processed trace records is 256.

12. The system of claim 1 wherein the trace data processor is programmed to identify trace records not to be compressed, and create a processed trace record identical to the trace record, and store said processed records in the trace memory.

13. The system of claim 6, 9, 7 or 10 wherein the complex programmable logic device is programmed to identify trace records not to be compressed, and create a processed trace record identical to the trace record, and store said processed records in the trace memory.

* * * * *